United States Patent
Sung et al.

(10) Patent No.: US 9,007,005 B2
(45) Date of Patent: Apr. 14, 2015

(54) INVERTER CONTROLLING SYSTEM AND METHOD FOR REDUCING NOISE IN ECO-FRIENDLY VEHICLE

(71) Applicants: Hyundai Motor Company, Seoul (KR); Kia Motors Corporation, Seoul (KR)

(72) Inventors: Yu Hyun Sung, Gyeonggi-do (KR); Seong Yeop Lim, Gyeonggi-do (KR); Jeong Min Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 174 days.

(21) Appl. No.: 13/715,616

(22) Filed: Dec. 14, 2012

(65) Prior Publication Data

US 2014/0084829 A1    Mar. 27, 2014

(30) Foreign Application Priority Data

Sep. 21, 2012 (KR) .................. 10-2012-0105455

(51) Int. Cl.
 H02K 29/06 (2006.01)
 H02P 6/00 (2006.01)
 H02P 27/08 (2006.01)
 H02P 21/00 (2006.01)
 B60L 7/14 (2006.01)
 B60L 15/00 (2006.01)

(52) U.S. Cl.
 CPC .............. *H02P 6/001* (2013.01); *H02P 27/085* (2013.01); *H02P 21/0096* (2013.01); *Y02T 10/643* (2013.01); *B60L 7/14* (2013.01); *B60L 15/007* (2013.01); *B60L 2200/10* (2013.01); *B60L 2200/18* (2013.01); *B60L 2200/32* (2013.01); *B60L 2200/40* (2013.01); *B60L 2210/40* (2013.01); *B60L 2240/421* (2013.01); *B60L 2240/423* (2013.01); *B60L 2240/526* (2013.01); *B60L 2270/142* (2013.01); *B60L 2270/145* (2013.01)

(58) Field of Classification Search
 USPC .......... 318/400.23, 400.01, 400.07, 701, 696, 318/702, 724, 739
 See application file for complete search history.

(56) References Cited

U.S. PATENT DOCUMENTS

RE36,568 E * 2/2000 Horst ............................ 318/701
2011/0015813 A1 * 1/2011 Munukur et al. ............... 701/22

FOREIGN PATENT DOCUMENTS

| JP | 08172705 A | 7/1996 |
|---|---|---|
| JP | 09070195 A | 3/1997 |
| JP | 2002051596 A | 2/2002 |
| JP | 2005130614 A | 5/2005 |
| JP | 2006211886 A | 8/2006 |
| JP | 2008301656 A | 12/2008 |
| JP | 2009118603 A | 5/2009 |

* cited by examiner

*Primary Examiner* — Karen Masih
(74) *Attorney, Agent, or Firm* — Mintz Levin Cohn Ferris Glovsky and Popeo, P.C.; Peter F. Corless (57) ABSTRACT

Disclosed is a system and method of controlling an inverter to reduce noise in an eco-friendly vehicle. In the method, at least one of a current motor torque and a current motor speed is monitored in real-time. It is determined whether or not the at least one of the current motor torque and the current motor speed corresponds to a noise occurrence range set to a current switching frequency. A changed switching frequency value corresponding to the at least one of the current motor torque and the current motor speed is calculated when the at least one of the current motor torque and the current motor speed corresponds to the noise occurrence range. A PWM signal is generated using the changed switching frequency value to control an inverter.

12 Claims, 6 Drawing Sheets

PRIOR ART

(a) RELATED ART (b) PRESENT INVENTION

FIG. 6

INVERTER CONTROLLING SYSTEM AND METHOD FOR REDUCING NOISE IN ECO-FRIENDLY VEHICLE

CROSS-REFERENCE TO RELATED APPLICATION

This application claims under 35 U.S.C. §119(a) the benefit of Korean Patent Application No. 10-2012-0105455 filed Sep. 21, 2012, the entire contents of which are incorporated herein by reference.

BACKGROUND (a) Technical Field

The present invention relates to a system and method of controlling an inverter in an eco-friendly vehicle. More particularly, it relates to a system and method which reduces noise caused by the switching frequency of an inverter by changing the frequency range of generated noise according to the inverter switching frequency of an eco-friendly vehicle.

(b) Background Art

Generally, eco-friendly vehicles including Pure Electric Vehicles (EV), Hybrid Electric Vehicles (HEV), and Fuel Cell Electric Vehicles (FCEV) use an electric motor as at least one driving source for driving. In particular, eco-friendly vehicles typically utilize a drive motor to convert a direct current stored in a main battery into a three-phase alternating current to drive a motor, and deliver a driving force of the motor to one or more driving wheels of the vehicle.

In eco-friendly vehicles, kinetic energy is converted into electric energy through regenerative braking upon deceleration, and electric energy is typically stored in a battery. Thereafter, energy stored in the battery is reused for driving of a motor to improve the fuel efficiency.

Figure 1:
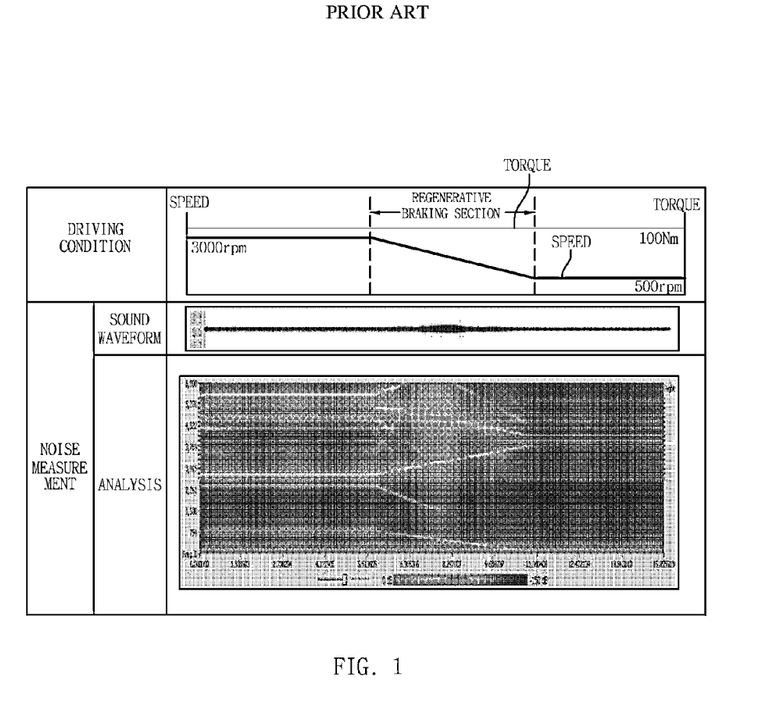
FIG. 1 is a view illustrating a limitation in the conventional art.

In a motor system which includes both an inverter and a motor of an eco-friendly vehicle, a high frequency noise is often generated during driving/regenerative driving when the inverter is operating. FIG. 1 is a view illustrating noise generated during the regenerative braking (i.e., corresponding to a section in which the speed of a motor is decelerating) when the switching frequency of an inverter is 4 kHz in a motor system.

As shown in FIG. 1, when the switching frequency of the inverter is 4 kHz, noise generated during driving is within a range of 2 kHz to 5 kHz that is most sensitive to human ears. When such noise occurs, a driver or a passenger may feel discomfort.

In the analysis graph of FIG. 1, the horizontal axis (X-axis) denotes time, and the vertical axis (Y-axis) denotes frequency. As shown in FIG. 1, noise occurrence portions are concentrated within about 2 kHz to 5 kHz (i.e., the region between dotted lines).

Accordingly, there is a need for a system and method of moving the frequency range of noise out a range between 2 kHz to 5 kHz (refer to equal-loudness contour curve) that is known as the most sensitive frequency to the ear.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system and method which reduces noise caused by a switching frequency of an inverter by changing the frequency range of generated noise according to the inverter switching frequency of an eco-friendly vehicle.

In one aspect, the present invention provides a system and method of controlling, by a controller, an inverter to reduce noise in an eco-friendly vehicle. More specifically, the method includes: monitoring, by the controller, at least one of a current motor torque and a current motor speed in real-time; determining, by the controller, whether or not the at least one of the current motor torque and the current motor speed corresponds to a noise occurrence range set to a current switching frequency; calculating, by the controller, a changed switching frequency value corresponding to the at least one of the current motor torque and the current motor speed when the at least one of the current motor torque and the current motor speed corresponds to the noise occurrence range; and generating, by the controller, a Pulse Width Modulation (PWM) signal using the changed switching frequency value to control an inverter.

In an exemplary embodiment, determining whether or not the current motor torque corresponds to the noise occurrence range may include determining whether or not the current motor torque corresponds to the motor torque range using a torque-switching frequency noise range map regulating a motor torque range in which noise is generated with respect to each switching frequency.

In another exemplary embodiment, determining whether or not the current motor speed corresponds to the noise occurrence range may include determining whether or not the current motor speed corresponds to the motor speed range using a speed-switching frequency noise range map regulating a motor speed range in which noise is generated with respect to each switching frequency.

In still another exemplary embodiment, calculating the changed switching frequency value may include using a speed-torque-switching frequency table that defines the changed switching frequency values with respect to each motor torque and motor speed to calculate the changed switching frequency corresponding to the current motor torque and the current motor speed.

In yet another exemplary embodiment, calculating the changed switching frequency value may include using a torque-switching frequency table that defines the changed switching frequency values with respect to each motor torque to calculate the changed switching frequency corresponding to the current motor torque.

In still yet another exemplary embodiment, calculating the changed switching frequency value may include using a speed-switching frequency table that defines the changed switching frequency values with respect to each motor speed to calculate the changed switching frequency corresponding to the current motor speed.

In a further exemplary embodiment, when either the current motor torque or the current motor speed deviates from the noise occurrence range set to the current switching frequency, the switching frequency may return to a base switching frequency that is preset.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| 11: real-time monitoring unit | 12: current command generator |
| --- | --- |
| 13: current controller | 14, 18: coordinate converter |
| 15: PWM signal generator | 16: PWM inverter |
| 17: motor | 19: speed calculator |
| 21: torque-switching frequency noise range map | |
| 22: speed-switching frequency noise range map | |
| 23: speed-torque-switching frequency table | |

It should be understood that the appended drawings are not necessarily to scale, presenting a somewhat simplified representation of various preferred features illustrative of the base principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about.

The above and other features of the invention are discussed infra.

Hereinafter, exemplary embodiments of the present invention will be described in detail with reference to the accompanying drawings so that those skilled in the art can easily carry out the present invention.

The present invention is provided to prevent as much noise as possible from occurring from an inverter switching frequency in eco-friendly vehicles, and relates to an inverter controlling system and method which minimizes the occurrence of noise that is sensitive to a driver or a passenger by simply improving the control logic instead of adding or modifying hardware such as noise/vibration protective pads to remove inverter noise generated during the driving of eco-friendly vehicles.

Particularly, the inverter controlling method is characterized in that noise can be reduced by using a system and method of changing the frequency range of generated noise caused by the switching frequency (e.g., moving the frequency range of noise out of a noise frequency range (e.g., about 2 kHz to about 5 kHz) sensitive to human)), by monitoring, by a controller, information on at least one of a current motor torque and a current motor speed in real-time, verifying, by the controller, entrance into a noise occurrence range using the information on at least one of the monitored motor torque and motor speed, and changing, by the controller, a current inverter switching frequency into a set value according to the motor torque, the motor speed, or the motor torque and the motor speed once the entrance into the noise occurrence range is verified.

When the inverter switching frequency is changed, the noise characteristics may be changed according thereto, allowing the frequency range of inverter occurrence noise to be changed. Based on such a principle, since the inverter switching frequency is appropriately changed according to the driving conditions of a vehicle, the frequency of noise, which is unpleasant to most drivers or passengers, may be changed, and thus noise sensitive to a driver and a passenger can be minimized.

Figure 2:
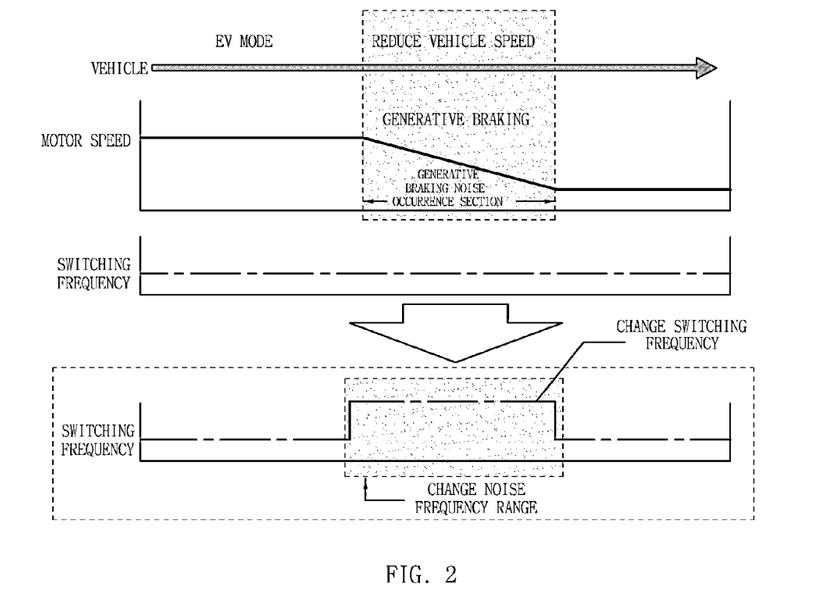
FIG. 2 is a view illustrating a change of a switching frequency according to an exemplary embodiment of the present invention.
Figure 3:
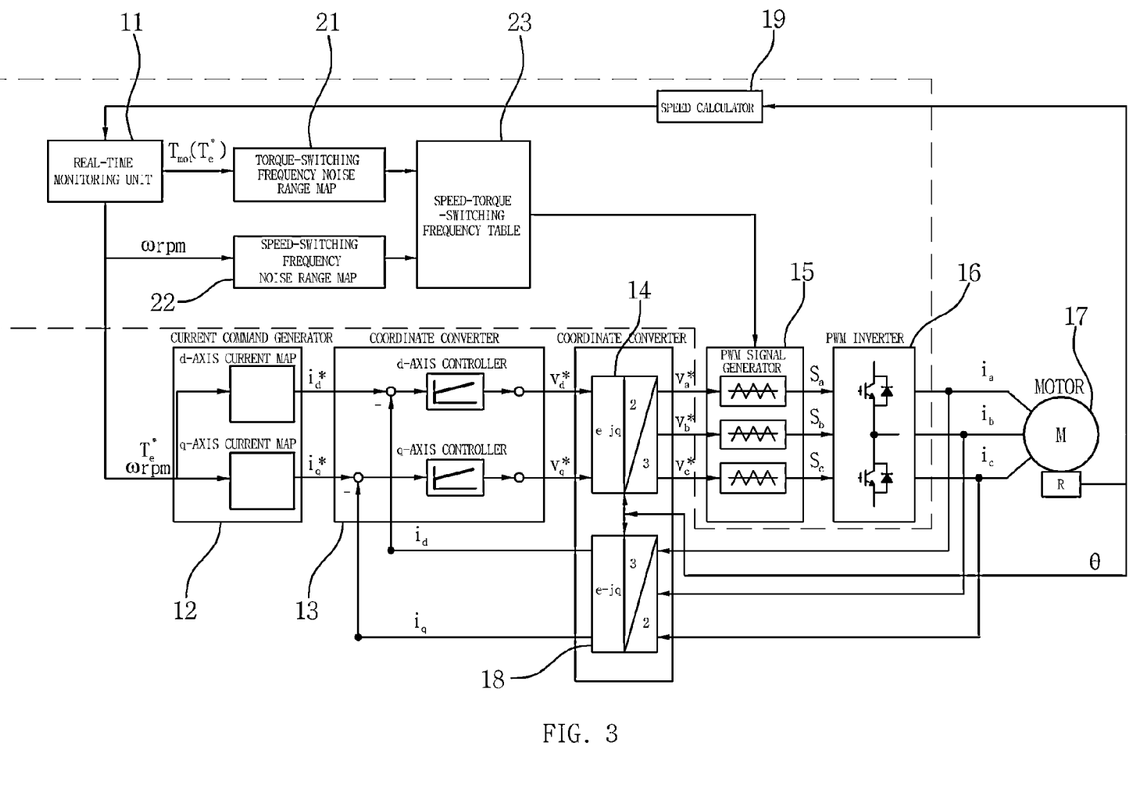
FIG. 3 is a view illustrating a control system in which switch frequency variable control is performed according to an exemplary embodiment of the present invention.

FIG. 2 is a view illustrating a change of a switching frequency according to an exemplary embodiment of the present invention. FIG. 3 is a view illustrating a control system in which switch frequency variable control is performed according to an exemplary embodiment of the present invention.

Figure 4:
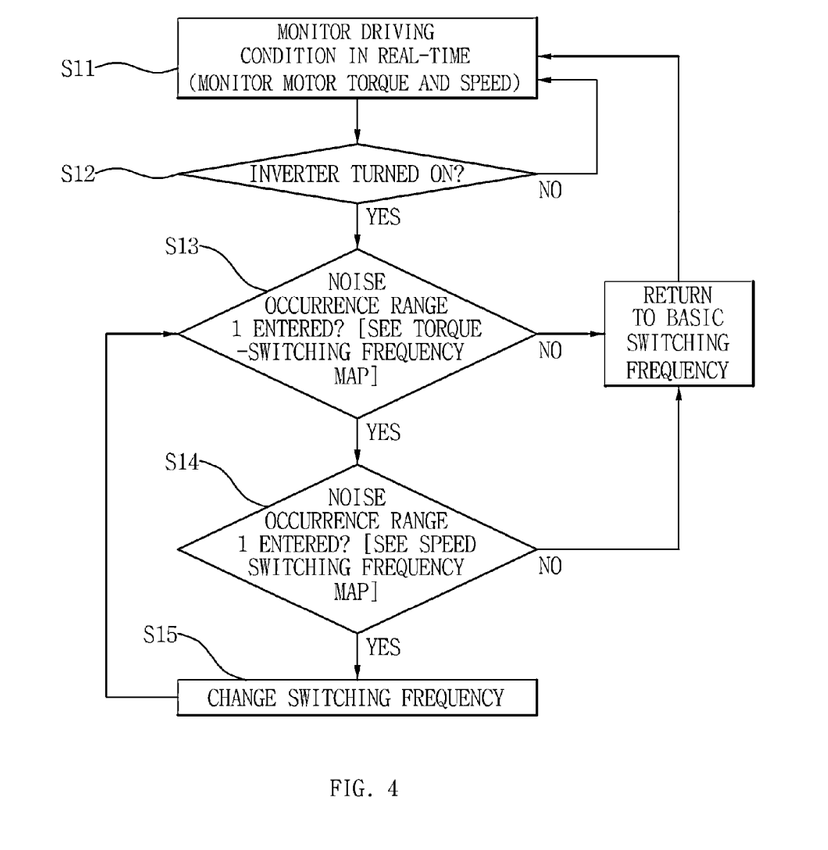
FIG. 4 is a flowchart illustrating a control process according to an exemplary embodiment of the present invention.
Figure 5:
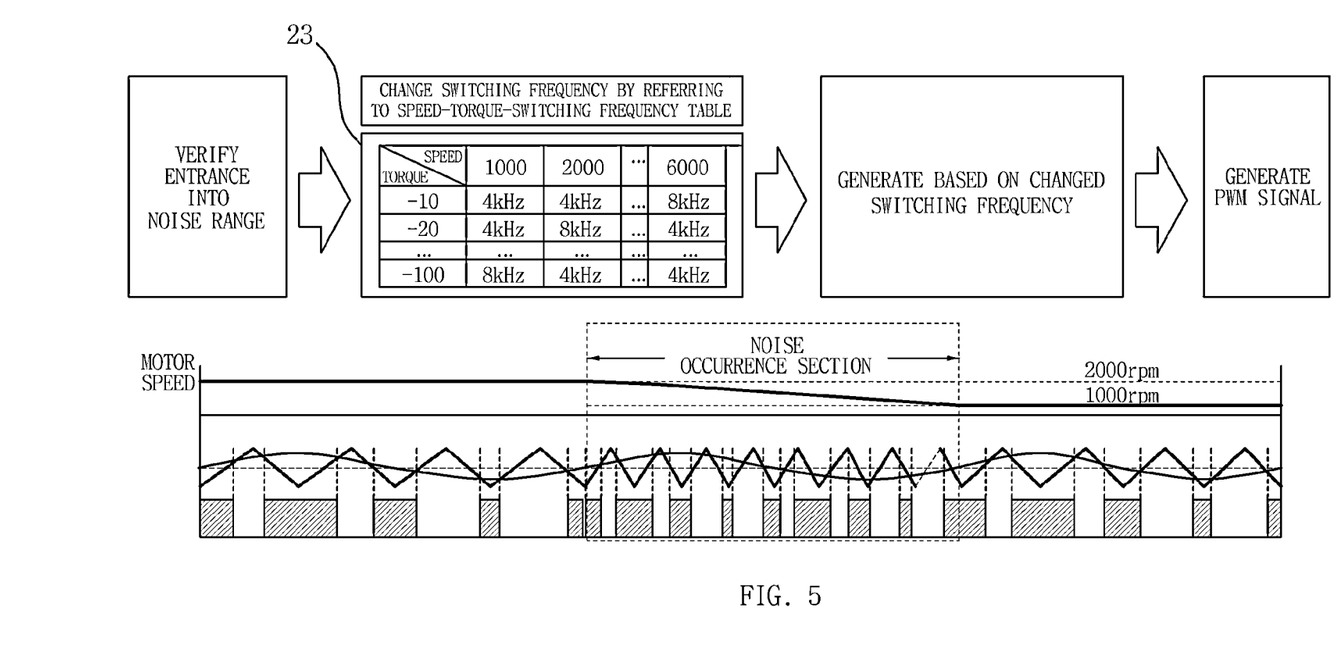
FIG. 5 is a view sequentially illustrating verification of entrance into noise occurrence range, change of switching frequency, generation of triangle wave, and Pulse Width Modulation (PWM) signal generation processes according to an exemplary embodiment of the present invention.

FIG. 4 is a flowchart illustrating a control process according to an embodiment of the present invention. FIG. 5 is a view sequentially illustrating verification of entrance into noise occurrence range, change of switching frequency, generation of triangle wave, and Pulse Width Modulation (PWM) signal generation processes according to an exemplary embodiment of the present invention.

As shown in FIG. 2, in an inverter controlling method according an exemplary embodiment of the present invention, the noise frequency range may be varied by changing the inverter switching frequency in a noise occurrence section when the vehicle is in EV mode.

Particularly, the frequency range of the inverter occurrence noise may be changed by variably controlling the inverter switching frequency according to the driving conditions (e.g., current motor torque and current motor speed) of a vehicle.

FIG. 2 shows that the inverter noise may be overcome by changing the switching frequency and the switching frequency may be changed over the entire section of the regenerative braking. However, as described below, since the switching frequency is changed after determining that the motor torque and the motor speed correspond to the noise occurrence range, the switching frequency does not necessarily have to be changed over the entire regenerative braking section as shown in FIG. 2, but may be changed only at the motor torque and speed corresponding to the condition of the noise occurrence range.

In this embodiment, information on at least one of a current motor torque and a current motor speed may be monitored in real-time, and then entrance into a noise occurrence range may be verified by the controller using the information on at least one of the monitored motor torque and motor speed. When the entrance into the noise occurrence range is verified, a current inverter switching frequency may be changed into a set value according to the motor torque, the motor speed, or the motor torque and the motor speed. In this process, although the information related to at least one of the current motor torque and motor speed is used, the following embodiments will be described as a case where the motor torque and the motor speed are both used. Also, either case where only the information related to the motor torque is used or only the information related to the motor speed is used should be construed as falling within the scope of the present invention.

FIG. 3 illustrates a process of monitoring the motor torque ($T_{mot}$) and the motor speed ($\omega_{rpm}$) while driving a vehicle by a real-time monitoring unit 11 in the controller, a process of verifying that the current motor torque and speed correspond to the noise occurrence range using a torque-switching frequency noise range map 21 and a speed-switching frequency noise range map 22, a process of changing the switching frequency when corresponding to the noise occurrence range, and a process of generating a PWM signal at a PWM signal generator 15 using the changed switching frequency.

Referring to FIG. 4, in a system and method of controlling an inverter according to an exemplary embodiment of the present invention, the controller (via the real-time monitoring unit) may monitor the driving conditions, i.e., the current motor torque ($T_{mot}$) and motor speed ($\omega_{rpm}$) upon the vehicle entering an EV mode (S11).

Next, after the inverter is turned on (S12), the controller determines whether or not the current motor torque ($T_{mot}$) and motor speed ($\omega_{rpm}$) correspond to the noise occurrence range using the torque-switching frequency noise range map 21 and the speed-switching frequency noise range map 22 (S13 and S14). When both motor torque ($T_{mot}$) and motor speed ($\omega_{rpm}$) at the current switch frequency are determined to correspond to the noise occurrence range, the switching frequency may be changed. When either the motor torque or the motor speed deviates from the noise occurrence range, the switching frequency may return to the base switching frequency.

In case of deviating from the regulated noise occurrence range, when the current switching frequency is the base switch frequency (e.g., about 4 kHz) that is set in the corresponding inverter system, the base switching frequency may be maintained. However, when a previous switching frequency has already been variably controlled into a frequency other than the base switching frequency, since there is no concern that an unpleasant noise will be generated, the previously changed switching frequency may return to the base switching frequency.

In this embodiment, the torque-switching frequency noise range map 21 and the speed-switching frequency noise range map 22 are maps that are made and stored using data acquired after preceding tests is performed on motors having the same specifications, respectively. This data may be stored in a memory of a controller or any other storage device to which the controller has access such as a remote server, hard drive, etc. The torque-switching frequency noise range map 21 and the speed-switching frequency noise range map 22 include data regulating a torque range and a speed range in which noise of a range (e.g., about 2 kHz to about 5 kHz) sensitive to humans with respect to each switching frequency may occur. Thus, it is determined whether or not the current motor torque ($T_{mot}$) and motor speed ($\omega_{rpm}$) correspond to the motor torque range and the motor speed range of the current switching frequency, using the two maps 21 and 22 regulating the motor torque range and the motor speed range in which noise of a specific frequency range (e.g., about 2 kHz to about 5 kHz) occurs.

The motor torque ($T_{mot}$) monitored by the controller may be a torque command ($T_e^*$) inputted into a current command generator (generating d-axis and q-axis current commands) for real-time motor control, or may be a motor torque value that is actually measured by a sensor in the motor. Also, the motor speed ($\omega_{rpm}$) monitored by the controller may be a motor speed that is detected in real-time by a speed detector. For example, as shown in FIG. 3, the motor speed ($\omega_{rpm}$) may be a motor speed that is calculated from a speed calculator 19 based on an absolute angle location (θ) calculated by a resolver (R) of a motor 17.

In typical motor control, the absolute angle location (θ) may be detected by the resolver (R) mounted in the motor 17, and may be inputted into the speed calculator (differentiator) 19 to calculate the motor speed ($\omega_{rpm}$) via the controller's processor. In this exemplary embodiment, the motor speed ($\omega_{rpm}$) may be used to determined entrance into the noise occurrence range at the current switching frequency as described above, and may also be used to vary the switch frequency in the controller as described below. On the other hand, when both current motor torque ($T_{mot}$) and motor speed ($\omega_{rpm}$) correspond to the noise occurrence range, as shown in FIG. 4, a process of changing the switching frequency may proceed (S15).

The process of changing the switching frequency may include a process of obtaining, by the controller, a switching frequency corresponding to the current motor torque ($T_{mot}$) and motor speed ($\omega_{rpm}$) from a speed-torque-switching frequency table 23 as shown in FIG. 5. Thus, when the inverter switching frequency is changed into a set switching frequency according to the current motor torque ($T_{mot}$) and motor speed ($\omega_{rpm}$), the changed switching frequency may be delivered to the PWM signal generator 15 to generate a triangle-wave oscillator signal based on the changed switching frequency value, and then a PWM signal may be generated (see FIG. 5). Since the generation of the triangle-wave oscillator signal and the PWM signal based on the switching frequency is well-known in the art, a detailed description thereof will be omitted herein.

However, in this exemplary embodiment, the switching frequency may be varied according to the current motor torque ($T_{mot}$) and motor speed ($\omega_{rpm}$) using the speed-torque-switching frequency table 23, and the PWM signal may be generated based on the changed switching frequency value. In this case, turning-on/off of a switching element in the PWM inverter may be controlled according to the PWM signal.

The speed-torque-switching frequency table 23 may include data that is pre-stored within the controller (or any other accessible storage device, e.g., a remote server or hard drive) to vary the switching frequency in real-time, and may be obtained from preceding tests performed on motors having the same specifications. Also, the speed-torque-switching frequency table 23 may become data in which changed switching frequency values are defined with respect to each motor torque and motor speed.

FIG. 3 shows a typical system configuration including a current command generator 12 for generating d-axis and q-axis current commands $i_d^*$ and $i_q^*$, a current controller 13 for generating d-axis and q-axis voltage commands $V_d^*$ and $V_q^*$, a d-q/three-phase coordinate converter 14 for obtaining three-phase voltage commands $V_a^*$, $V_b^*$ and $V_c^*$, and a three-phase/d-q coordinate converter 18 for a d-axis feedback current ($i_d$) and a q-axis feedback current ($i_q$). However, since this configuration is well-known in the art, a detailed description thereof will be omitted herein.

Thus, the frequency range of generated noise according to the inverter switching frequency is varied by changing the current inverter switching frequency when verifying entrance into the noise occurrence range using the motor torque and the motor speed that are monitored in real-time. In this case, since the noise frequency is moved out of the frequency range sensitive to human, a driver or a passenger may not feel noise.

According to an embodiment of the present invention, a noise/vibration protective pad or a noise/vibration protective member may be separately provided. Also, a simple control logic (e.g., program instructions) may be added to reduce a discomfort of a driver of a passenger without changing the structure. Also, when the switching frequency is high, the inverter noise may be reduced, and when the switching frequency is low, the inverter efficiency and the fuel efficiency may be improved. In this case, when the base switching frequency is set high in the entire operation range to reduce the inverter noise, and the inverter efficiency and the fuel efficiency may be reduced.

Thus, when the switching frequency is variably changed into an optimum switching frequency in real-time according to the driving conditions (e.g., current motor torque and motor speed) of a vehicle, the fuel efficiency may be maximized and the inverter noise reduced compared to a case where the base switching frequency is set high.

Figure 6:
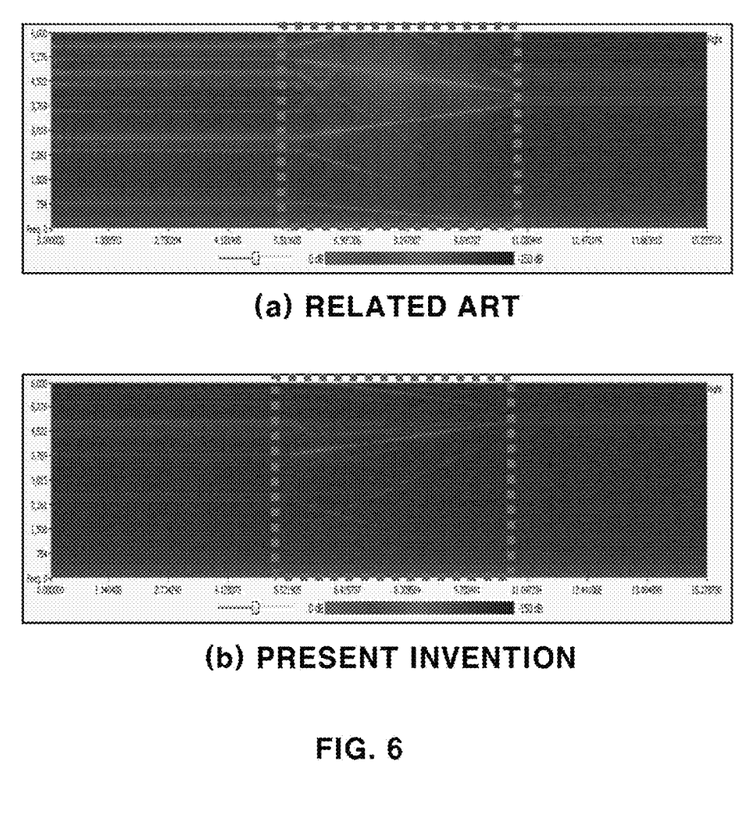
FIG. 6 is a view illustrating a noise frequency range varying when a control method according to an exemplary embodiment of the present invention is applied.

FIG. 6 is a view illustrating an effect of the embodiment of the present invention. Referring to FIG. 6, it can be seen that when the noise frequency range is changed, noise occurrence in a range (red dotted line) of about 2 kHz to about 5 kHz, sensitive to a human ear, is significantly reduced compared to a typical case.

According to an inverter controlling system and method of the present invention, inverter noise can be minimized by verifying entrance into noise occurrence range using a motor torque and a motor speed that are monitored in real-time and changing the noise frequency through real-time variable operation of an inverter switching frequency. Particularly, noise that may give a discomfort to a driver or a passenger can be significantly improved only by adding a simple control logic without installing a noise/vibration protective pad or a separate apparatus for preventing noise/vibration, or changing the design or structure of hardware. Also, since variable operation is performed based on an optimum switching frequency according to the driving conditions of a vehicle, the inverter noise can be reduced and the fuel efficiency can be maximized compared to when a base switching frequency is set high.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling an inverter to reduce noise in an eco-friendly vehicle, the method comprising:
    monitoring, by a controller, at least one of a current motor torque and a current motor speed in real-time;
    determining, by the controller, whether or not the at least one of the current motor torque and the current motor speed corresponds to a noise occurrence range set to a current switching frequency, which includes determining whether or not the current motor torque corresponds to the motor torque range using a torque-switching frequency noise range map regulating a motor torque range in which noise is generated with respect to each switching frequency;
    calculating, by the controller, a changed switching frequency value corresponding to the at least one of the current motor torque and the current motor speed when the at least one of the current motor torque and the current motor speed corresponds to the noise occurrence range; and
    generating, by the controller, a Pulse Width Modulation (PWM) signal using the changed switching frequency value to control an inverter.

2. The method of claim 1, wherein determining whether or not the current motor speed corresponds to the noise occurrence range comprises determining whether or not the current motor speed corresponds to the motor speed range using a speed-switching frequency noise range map regulating a motor speed range in which noise is generated with respect to each switching frequency.

3. The method of claim 1, wherein calculating the changed switching frequency value comprises using a speed-torque-switching frequency table that defines the changed switching frequency values with respect to each motor torque and motor speed to calculate the changed switching frequency corresponding to the current motor torque and the current motor speed.

4. The method of claim 1, wherein calculating the changed switching frequency value comprises using a torque-switching frequency table that defines the changed switching frequency values with respect to each motor torque to calculate the changed switching frequency corresponding to the current motor torque.

5. The method of claim 1, wherein calculating the changed switching frequency value comprises using a speed-switching frequency table that defines the changed switching frequency values with respect to each motor speed to calculate the changed switching frequency corresponding to the current motor speed.

6. The method of claim 1, wherein when either the current motor torque or the current motor speed deviates from the noise occurrence range set to the current switching frequency, the switching frequency returns to a base switching frequency that is preset.

7. A non-transitory computer readable medium containing program instructions executed by a controller to reduce noise from an inverter in an eco-friendly vehicle, the computer readable medium comprising:
program instructions that monitor at least one of a current motor torque and a current motor speed in real-time;
program instructions that determine whether or not the at least one of the current motor torque and the current motor speed corresponds to a noise occurrence range set to a current switching frequency, which includes determining whether or not the current motor torque corresponds to the motor torque range using a torque-switching frequency noise range map regulating a motor torque range in which noise is generated with respect to each switching frequency;
program instructions that calculate a changed switching frequency value corresponding to the at least one of the current motor torque and the current motor speed when the at least one of the current motor torque and the current motor speed corresponds to the noise occurrence range; and
program instructions that generate a Pulse Width Modulation (PWM) signal using the changed switching frequency value to control an inverter.

8. The non-transitory computer readable medium of claim 7, wherein the program instructions that determine whether or not the current motor speed corresponds to the noise occurrence range comprise program instructions that determine whether or not the current motor speed corresponds to the motor speed range using a speed-switching frequency noise range map regulating a motor speed range in which noise is generated with respect to each switching frequency.

9. The non-transitory computer readable medium of claim 7, wherein the program instructions that calculate the changed switching frequency value use a speed-torque-switching frequency table that defines the changed switching frequency values with respect to each motor torque and motor speed to calculate the changed switching frequency corresponding to the current motor torque and the current motor speed.

10. The non-transitory computer readable medium of claim 7, wherein the program instructions that calculate the changed switching frequency value comprise the use a torque-switching frequency table that defines the changed switching frequency values with respect to each motor torque to calculate the changed switching frequency corresponding to the current motor torque.

11. The non-transitory computer readable medium of claim 7, wherein program instructions that calculate the changed switching frequency value use a speed-switching frequency table that defines the changed switching frequency values with respect to each motor speed to calculate the changed switching frequency corresponding to the current motor speed.

12. The non-transitory computer readable medium of claim 7, wherein when either the current motor torque or the current motor speed deviates from the noise occurrence range set to the current switching frequency, the switching frequency returns to a base switching frequency that is preset.

* * * * *